Patented Oct. 31, 1922.

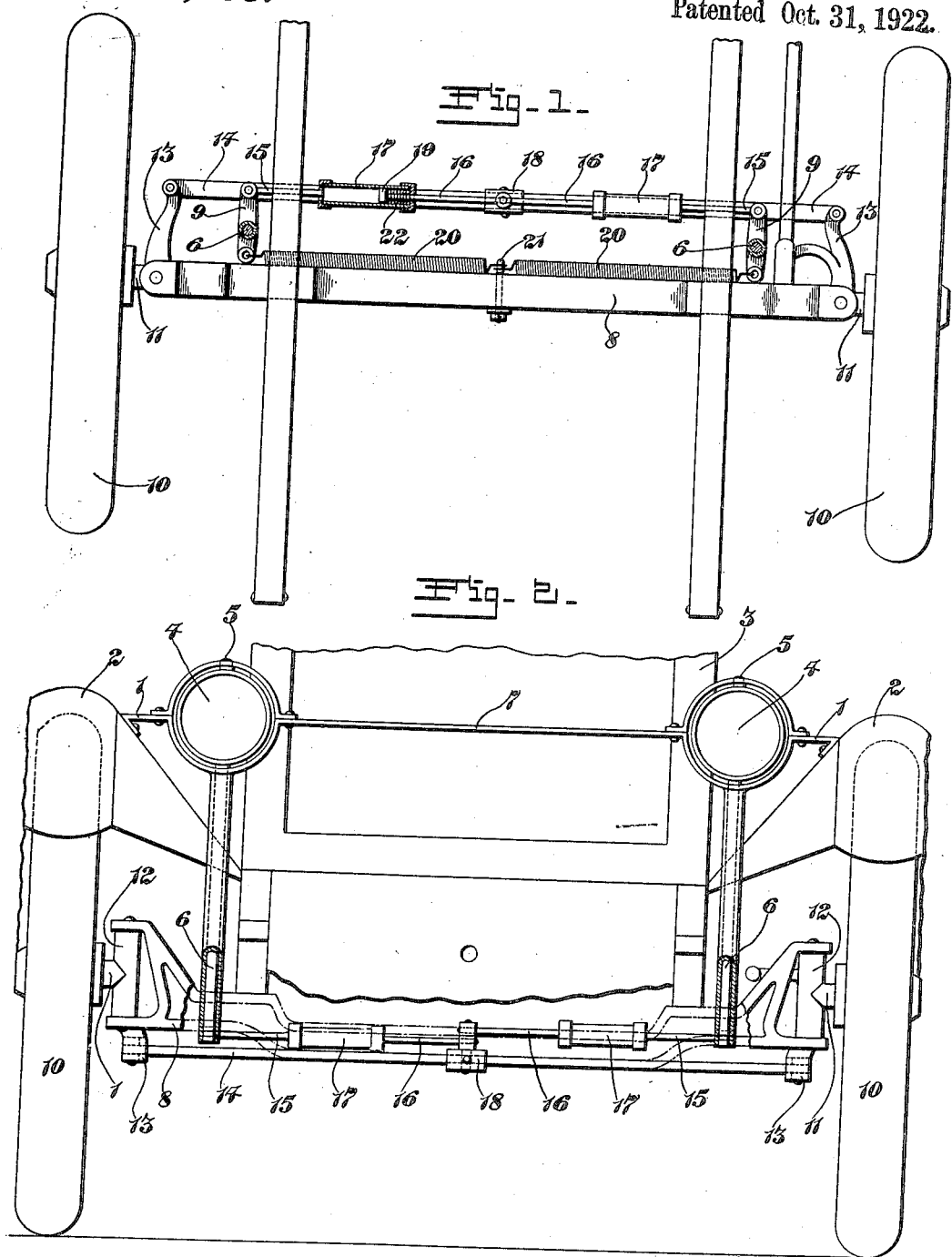

1,433,585

UNITED STATES PATENT OFFICE.

FRANCIS M. WISELEY, OF CLAYTON, NEW MEXICO.

DIRIGIBLE MOUNTING FOR VEHICLE LAMPS.

Application filed April 11, 1921. Serial No. 460,442.

*To all whom it may concern:*

Be it known that I, FRANCIS M. WISELEY, a citizen of the United States, residing at Clayton, Union County, New Mexico, have invented a new and useful Dirigible Mounting for Vehicle Lamps, of which the following is a specification.

This invention relates to improvements in dirigible mountings for vehicle lamps, and consists in the novel construction hereinafter disclosed.

An object of the invention is to provide in a motor vehicle a pair of head lights supported and controlled so that they are independently operable incident to the change of direction of the motor vehicle.

Additional advantages and novel features of the construction will be apparent from the following detailed description thereof, taken in connection with the accompanying drawing, in which—

Fig. 1 is a plan view of the operating mechanism for the lamps shown in association with the co-operating parts of the motor vehicle.

Fig. 2 is a front elevation showing the embodiment of the invention.

As illustrated in the drawing, the motor vehicle is provided with lamp supports positioned at each side of the vehicle, each of said supports comprising a frame 1 conveniently attached to the fenders and extending intermediate the inner surface of the fenders 2 and the radiator 3 of the vehicle. Each of the supports for the lamps is made in separable sections so that the lamps 4, which are provided with short studs 5 and downwardly extending stems 6, may be pivotally mounted in the support. In order to impart rigidity to the lamp supports a cross rod 7 extending between the supports may be provided. The stems 6 of the lamps extend downwardly to a point just beneath the front axle 8 of the vehicle. To the lower end of each of the stems is attached a lever 9, said lever extending in the longitudinal direction of the vehicle but substantially at right angles to the axle.

The front wheels 10, as is usual in motor vehicle construction, are supported on stud shafts 11 which are a part of the steering knuckle 12 mounted at the ends of the front axle. The steering knuckle arms 13 extend rearwardly from the steering knuckles and are connected by the cross bar 14.

The mechanism for operating the lamps independently of each other is connected with the steering mechanism of the automobile. As shown, a rod 15 is pivoted to the rear end of each of the levers 9 for universal pivotal movement. Each of the rods 15 extend inwardly for cooperation with an associated rod 16. The inner end of each of the rods 15 supports a dash pot cylinder 17. The inner ends of the rods 16 are pivoted for universal movement, that is for movement in any direction, to a bracket or clevis 18 attached to the connecting rod 14. The outer end of each of the rods 16 extends into the adjacent dash pot cylinder 17 and has a piston 19 thereon in the dash pot. A spring 22 encircles each rod 16 within the dash pot, the inner end of the spring bearing against the inner end of the dash pot and the outer end of the spring bearing against the piston 19.

A strong spring 20 of the retractile type is connected to the forward end of each of the levers 9, the inner ends of said springs 20 being connected to an attachment 21 on the axle 8. It will be observed (Fig. 1) that when the automobile is travelling straight ahead, the pistons 19 are a considerable distance from the outer ends of the cylinders 17. If the automobile be turned, the inside lamp will be turned with the steering mechanism due to the fact that the piston 19 controlling the inside lamp exerts pressure against the spring 22 sufficient to overcome the power of the spring 20. At the same time the outside lamp is left in its original position due to the fact that the piston 19 controlling the outside lamp is free to move in the cylinder 17 toward the outer end of said cylinder. The pivotal connection between the inner ends of the rods 16 and the bracket 18 may be of any well known connection permitting free swinging movement of the rods 16 in any direction.

In the operation of the steering mechanism the movement of the cross bar 14 is in a direction opposite to the direction of turn of the vehicle. Thus, as the vehicle is turned, the lever 9 on the side of the vehicle in the direction of the turn is operated by a pull on the flexible link connection, thereby turning the lamp on the side in the direction of the turn to follow the path of the vehicle; while the lamp on the other side remains stationary due to the fact that there is a lost motion in the dash pot of the flexible link connection on that side of the vehicle. In order that there may be no jerk or sudden movement of the lamp it will be noted that springs 22 are provided in the dash pot intermediate the piston and the head of the dash pot cylinder. When the steering mechanism is brought to a straight away direction the springs 20 serve to restore the lamps to normal position.

From the foregoing description of the construction it will be apparent that it accomplishes a very desirable function in that it preserves the adjustment of one of the lamps straight to the front, while the other lamp is turned to light the path of the changed direction of the vehicle thus illuminating a wide area at the point of turn of the vehicle.

I am aware that the invention may be modified in certain particulars without departing from the spirit and scope thereof. What I claim and desire to secure by Letters Patent is:—

1. In a motor vehicle having a steering mechanism and lamps, the combination of a stem for turning each of said lamps relative to the other, a lever attached to the lower end of each stem, a pair of rods having their outer ends pivoted to the rear ends of said levers respectively, a cylinder on the inner end of each of said rods, a second pair of rods having their inner ends pivoted to the steering mechanism and having their outer ends extending into said cylinders respectively, a piston on the outer end of each of said second pair of rods within the cylinder into which the rod extends, said pistons being relatively a considerable distance from the outer ends of the cylinders when the vehicle is travelling straight ahead, a spring in each dash pot between the inner end of the dash pot and the piston therein, and a spring connected to each of said levers for actuating the spring to restore the lamps to position to throw light straight ahead after the vehicle has completed its turn.

2. In a motor vehicle having lamps and steering mechanism, a stem for turning the lamps respectively, to light the path of the changed direction of the vehicle, a lever in connection with each of said stems, a rod pivoted to the rear end of each of said levers, a pair of rods pivoted to the steering mechanism for cooperation with the rods that are pivoted to the levers, a dash pot device connecting the rod that is pivoted to each lever with the cooperating rod that is pivoted to the steering mechanism arranged to turn the inside lamp as an incident to the turning of the vehicle, and to leave the outside lamp undisturbed, and means for restoring the lamp to its initial position after the vehicle has completed its turn.

FRANCIS M. WISELEY.